United States Patent [19]

Dean

[11] Patent Number: 4,568,724

[45] Date of Patent: Feb. 4, 1986

[54] MOLDING COMPOSITION WHICH CONTAINS A γ-SULTONE DERIVATIVE OF AN EPDM RUBBER

[75] Inventor: Barry D. Dean, Broomall, Pa.

[73] Assignee: Atlantic Richfield Company, Los Angeles, Calif.

[21] Appl. No.: 749,979

[22] Filed: Jun. 28, 1985

[51] Int. Cl.$^4$ .................. C08L 23/16; C08L 23/32; C08L 25/08; C08L 39/08
[52] U.S. Cl. .................. 525/203; 525/194; 525/205
[58] Field of Search .................. 525/194, 203, 205

[56] References Cited

U.S. PATENT DOCUMENTS 4,480,063 10/1984 Lundberg et al. .................. 525/203

Primary Examiner—Carman J. Seccuro
Attorney, Agent, or Firm—Dennis M. Kozak

[57] ABSTRACT

A moldable composition comprising a γ-sultone derivative of an ethylene/propylene/substituted methylene norbornene terpolymer and a polymer which comprises recurring units of a vinyl aromatic monomer, a monomer having an active hydrogen with an acidity constant (pKa) within the range of from about 7.5 to about 10.5 and a vinyl pyridine monomer selected from the group consisting of 2-vinyl pyridine and 4-vinyl pyridine is disclosed. Optionally, the polymer comprises recurring units of an ethylenically unsaturated monomer.

24 Claims, No Drawings

MOLDING COMPOSITION WHICH CONTAINS A γ-SULTONE DERIVATIVE OF AN EPDM RUBBER

This invention relates to molding compositions.

More specifically this invention relates to a moldable composition formed by reacting a functionalized ethylene/propylene diene (EPDM) rubber and a functionalized styrenic polymer in the melt phase whereby both a covalent bond and a Zwitterionic bond are formed between the EPDM rubber and the styrenic polymer.

U.S. Pat. No. 4,480,063 teaches sulfonation of EPDM rubber to form the free sulfonic acid which is subsequently neutralized to the metal sulfonate form and blended with co- and terpolymers containing vinyl pyridine. U.S. Pat. No. 4,447,582 teaches grafting EPDM rubber with a monomer having polar or functional groups which are capable of forming quaternary ammonium salts.

According to this invention there is provided a moldable composition comprising a γ-sultone derivative of an ethylene/propylene/substituted methylene norbornene terpolymer and a polymer comprising in weight percent from about 70 to about 90 recurring units of a vinyl aromatic monomer, from about 5 to about 15 recurring units of a monomer having an active hydrogen with an acidity constant (pK$_a$) within the range of from about 7.5 to about 10.5 and from about 5 to about 15 recurring units of a vinyl pyridine monomer selected from the group consisting of 2-vinyl pyridine and 4-vinyl pyridine.

Also according to this invention there is provided a method of producing a molded composition which comprises forming a blend comprising a γ-sultone derivative of an ethylene/propylene/substituted methylene norbornene terpolymer and a polymer comprising in weight percent from about 70 to about 90 recurring units of a vinyl aromatic monomer, from about 5 to about 15 recurring units of a monomer having an active hydrogen with an acidity constant (pK$_a$) within the range of from about 7.5 to about 10.5 and from about 5 to about 15 recurring units of a vinyl pyridine monomer selected from the group consisting of 2-vinyl pyridine and 4-vinyl pyridine, and molding the resulting blend.

Also according to this invention there is provided a method of producing a molded composition comprising a continuous phase and a disperse phase within the continuous phase, wherein said disperse phase is a γ-sultone derivative of an ethylene/propylene/substituted methylene norbornene terpolymer and said continuous phase is a polymer which comprises in weight percent from about 70 to about 90 recurring units of a vinyl aromatic monomer, from about 5 to about 15 recurring units of a monomer having an active hydrogen with an acidity constant (pK$_a$) within the range of from about 7.5 to about 10.5 and from about 5 to about 15 recurring units of a vinyl pyridine monomer selected from the group consisting of 2-vinyl pyridine and 4-vinyl pyridine.

The ethylene/propylene/substituted methylene norbornene terpolymers suitable for use in this invention should comprise from about 40 to 55 weight percent ethylene, 30 to 59 weight percent propylene and from about 1 to 15 weight percent of a substituted methylene norbornene with a preferred range of substituted methylene norbornene being from about 8 to 12 weight percent. Suitable substituted methylene norbornene termonomers are methylene norbornene (R=H), ethylidene norbornene (R=CH$_3$), propylidene norbornene (R=CH$_2$CH$_3$) and the like. Most preferred as the substituted methylene norbornene is ethylidene norbornene.

The ethylene/propylene/substituted methylene norbornene terpolymers suitable for use in this invention have weight average molecular weights of from 100,000 to 500,000 and polydispersity values (Mw/Mn) of from 1.7 to 5.0 as determined by high temperature gel permeation chromatography in toluene versus polypropylene standards. The preferred weight average molecular weight range is from about 150,000 to 350,000.

The sulfonation of the EPDM terpolymer to the γ-sultone requires dissolving the EPDM rubber in a suitable solvent and treating the EPDM rubber solution with an acylsulfate reagent/chlorinated aliphatic solvent solution.

Suitable solvents for the EPDM rubber are aliphatic and cycloaliphatic hydrocarbons such as pentane, hexane, heptane, and the like as well as cyclohexane, cyclooctane and the like. The most preferred solvent is heptane.

The sulfonation reaction of the ethylene/propylene/-substituted methylene norbornene terpolymer wherein the terpolymer is reacted with a sulfonation reagent to form a γ-sultone derivative of the substituted methylene norbornene termonomer is shown in the following (Eq.-1) wherein R represents H, or a C$_1$ to C$_5$ alkyl group.

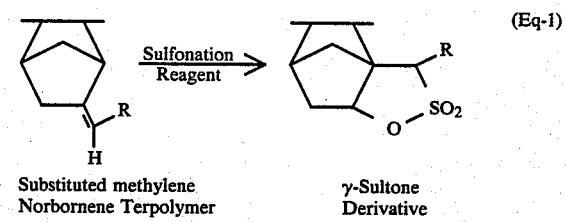

Substituted methylene Norbornene Terpolymer   γ-Sultone Derivative       (Eq-1)

Preparation of the acylsulfate reagent is described in U.S. Pat. No. 4,184,988, the teaching of which is incorporated herein. Preferred acylsulfates are those derived from the reaction of propionic anhydride or the mixed anhydride of propionic acid and lauric acid with sulfuric acid. The preferred chlorinated aliphatic solvent in which the acylsulfate is prepared is dichloromethane. The molar ratio of sulfonating agent to available unsaturation sites in the elastomeric polymer is 1.0 or less. Once the sulfonation is complete, the EPDM rubber, having the γ-sultone funcitionality must be recovered by precipitation into a nonaqueous or nonalcholic solvent such as acetone as opposed to employing the standard steam stripping technique so as to preserve the γ-sulfone functionality.

The level of γ-sultone functionality as measured by sulfur analysis should range between 10 to 100 milliequivalents per 100 grams of EPDM polymer. The most perferred γ-sultone functionality as measured by sulfur content analysis should range between 50 to 90 milliequivalents per 100 grams of EPDM polymer.

The styrenic polymer employed in the composition of this invention comprises from about 70 to about 90 weight percent recurring units of a vinyl aromatic monomer, 5 to 15 weight percent of a monomer having an active hydrogen with an acidity constant defined by a pK$_a$ of 7.5 to 10.5, from about 5 to about 15 weight percent recurring units of either 2-vinyl pyridine or 4-vinyl pyridine. Optionally, from about 10 to about 40 weight percent of an ethylenically unsaturated monomer can be substituted for the equal weight percent of vinyl aromatic monomer. In addition, the molar ratio of the monomer having an active hydrogen ($pK_a$=7.5 to 10.5) to the vinyl pyridine monomer, should not be less than about 1.0 or greater than about 1.75.

The vinyl aromatic monomers suitable for use in this invention are styrene, p-methylstyrene, α-methylstyrene, t-butylstyrene, dibromostyrene and the like. The preferred vinyl aromatic monomer is styrene.

The monomer having an active hydrogen with an acidity constant defined by a $pK_a$ of 7.5 to 10.5 can be malemide or p-hydroxy phenylmalemide, maleimide is preferred.

The optional α,B-ethylenically unsaturated monomers suitable for use in this invention include acrylonitrile, methylmethacrylate and N-substituted malemides. The preferred α,β-ethylenically unsaturated monomer is an N-substituted malemide, more specifically, N-phenyl malemide.

The number average molecular weight (Mn) of the styrenic polymer should be between 90,000 and 300,000 most preferably between 110,000 and 250,000 as determined by gel permeation chromatography (vs. monodisperse polystyrene standards).

The styrenic polymer can be prepared by bulk, solution or suspension polymerization with the preferred method being solution polymerization in methylethyl ketone. The polymerization is conducted at a temperature within the range of from about 60° C. to 120° C., most preferably between 70° C. to 90° C. Free radical initiators which are suitable for use include benzoylperoxide, t-butyl perpivalate, t-butyl peracetate, t-butyl peractoate, and t-butyl perbenzoate. Benzoylperoxide is the preferred initiator.

The molding compositions of this invention are prepared by mixing 1 to 30 weight percent of the γ-sultone derivative of the EPDM terpolymer and 99 to 70 weight percent styrenic polymer at a temperature 80° C. to 120° C. above the glass transition temperature of the styrenic polymer. In a preferred embodiment the composition of this invention will contain 15 to 25 weight percent of the γ-sultone derivative of the EPDM terpolymer and 75 to 85 weight percent of the styrenic polymer melt compounded in an extruder at 90° C. to 110° C. above the glass transition temperature of the styrenic polymer.

The following examples serve to demonstrate the invention. Evaluation of material properties was performed based on the following ASTM standard tests: flexural modulus (D-790), tensile strength (D-638), elongation (D638), notched Izod (D-256), and deflection temperature under load (DTUL) (D-648; ⅛" @264 psi) Gardner falling weight index (GFWI) values were estabished using a 1¼" diameter orifice and an 8 pound ½" diameter weight. Glass transistion temperatures were determined by differential scanning colorimetry.

EXAMPLE 1

This example serves to demonstrate the preparation of a γ-sultone EPDM rubber suitable for use to produce the moldable composition of this invention.

Heptane was purified by stirring over concentrated sulfuric acid for 24 hours followed by distillation.

Approximately 250 grams of Polysar ® 585 EPDM rubber (Polysar Co.) were dissolved in 350 ml of purified heptane. Polysar 585 EPDM rubber contains ethylidene norbornene at a 12 weight percent level. The EPDM/heptane solution was cooled to between 10° to 15° C. in an ice bath.

In a separate reaction vessel, 51 grams of the mixed anhydride from propionic acid and lauric acid were dissolved in 300 milliliters of dry dichloromethane. The solution was cooled to −45° C. with a dry ice/acetone bath. Approximately 19 grams of 97% sulfuric acid were added dropwise to the mixed anhydride solution over a 30 minute period with an additional 30 minutes of stirring at −45° C.

The resulting acylsulfate reagent solution was then added dropwise under an inert atmosphere at a temperature between 5° to 15° C. to the above prepared EPDM/heptane solution. The temperature of the EPDM/heptane/acylsulfate/dichloromethane solution was maintained at 15° C. for five hours once the addition of the acylsulfate solution was complete. The reaction was allowed to warm slowly to room temperature over a 12 hour period. The EPDM rubber was recovered by precipitation into distilled acetone.

The level of γ-sultone functionality as measured by sulfur analysis was 85 milliequivalents per 100 grams EPDM rubber.

EXAMPLE 2

This example serves to demonstrate the preparation of a styrene/maleimide/2-vinyl pyridine (S/MI/2-VP) polymer suitable for use to produce the moldable composition of this invention.

A 1-liter reactor was charged with 336 grams of styrene monomer and 40 grams of 2-vinyl pyridine monomer at room temperature. The reaction temperature was raised to 92° C. at which time the dropwise addition of a methylethylketone solution containing 23.6 grams of malemide monomer and 0.62 grams of benzoylperoxide was started. The dropwise addition was conducted over a 1.5 hour period at which time the solids level had reached 45% and the reaction was terminated. The level of conversion was 45.1% corresponding to 180.4 grams of polymer recovered by precipitation into methanol. The polymer was found to contain 13.2 weight percent malemide and 11.9 weight percent 2-vinyl pyridine. The malemide content was determined by titration with tetrabutylammonium hydroxide (B. E. Buell, *Anal. Chem.* 39 762, 1952) and the 2-vinyl pyridine content by differential elemental nitrogen analysis.

The S/MI/2-VP terpolymer exhibited a glass transition temperature of 135° C. as measured by differential scanning calorimetry. The number average molecular weight as determined by gel permeation chromatography versus monodisperse polystyrene standards was 113,700.

EXAMPLE 3

This example serves to demonstrate the preparation of a styrene/N-(3-chloro) phenylmalemide/maleimide/2-vinyl pyridine polymer (S/N-3Cl-PMI/MI/2-VP) suitable for use to produce a moldable composition of this invention.

A 1-liter reactor was charged with 304 grams of styrene monomer and 46 grams of 2-vinyl pyridine monomer at room temperature. The reaction temperature was raised to 94° C. at which time dropwise addition of a methyethyl ketone solution containing 33 grams of N-(3-chloro) phenylmaleimide monomer, 16.4 grams of maleimide monomer and 0.61 gram of benzoylperoxide was started. The dropwise addition was conducted over a 1.1 hour period at which time the solids level had reached 37% and the reaction was terminated. The level of conversion was 37.2% corresponding to 148.8 grams of polymer recovered by precipitation into methanol. The polymer was found to contain 23.1 weight percent N-(3-chloro) phenylmaleimide, 12.2 weight percent meleimide and 12.8 weight percent 2-vinyl pyridine. The maleimide content was determined by titration with tetrabutylammonium hydroxide, N-(3-chloro) phenylmaleimide by chlorine analysis, and 2-vinyl pyridine by differential elemental nitrogen analysis.

The S/N-(3-Cl) PMI/MI/2-VP polymer exhibited a glass transition temperature of 178° C. as measured by differential scanning calorimetry. The number average molecular weight as determined by gel permeation chromatography versus monodisperse polystyrene standards was 192,400.

EXAMPLE 4

This example serves to demonstrate the preparation of a thermoplastic molding composition of this invention.

Approximately 180 grams of the γ-sultone functionalized EPDM as prepared in Example 1 were physically mixed with 820 grams of the S/MI/2-VP polymer prepared according to the procedure of Example 2. Additionally, 4.2 grams of Ethanox ® 330 antioxidant [1,3,5-trimethyl-2,4,6-tris (3,5-di-tertbutyl-4-hydroxybenzyl) benzene] commercially available from Ethyl Corporation were added.

The composition was melt compounded and extruded into pellets at a temperature of 226° C. Test specimens were then injection molded at 225° C.; the physical properties of the molded composition appear in Table I.

TABLE I

| Component | Composition (wt %) | |
|---|---|---|
| S/MI/2-VP (Example 2) | 100 | 82 |
| EPDM (Example 1) | 0 | 18 |
| Property: | Property Value | |
| Tg (°C., DSC) | 135 | 133 |
| DTUL (⅛", F) | 218 | 207 |
| Tensile Strength (psi) | 7240 | 6170 |
| Notched Izod (ft-lbs/in) | 0.6 | 8.6 |
| GFWI (in-lbs) | <1 | 320+ |
| Elongation (%) | 2.2 | 54 |

EXAMPLE 5

This example serves to demonstrate the preparation of a thermoplastic molding composition of this invention also containing recurring units of an optional N-phenylmaleimide monomer in the styrenic polymer.

Approximately 180 grams of the γ-sultone functionalized EPDM prepared according to the procedure of Example 1 were mixed with 820 grams of the S/N(3-Cl)-PMI/MI/2-VP polymer prepared according to Example 3. Additionally, 6.3 grams of Ethanox ® 330 antioxidant were added.

The composition was melt compounded and extruded into pellets at a temperature of 270° C. Test specimens were injection molded at 273° C.; the physical property value of the molded composition appear below in Table II.

TABLE II

| Component | Composition (wt %) | |
|---|---|---|
| S/N-(3-Cl)PMI/MI/2-VP | 100 | 82 |
| EPDM (Example 1) | 0 | 18 |
| Property: | Property Value | |
| Tg (°C., DSC) | 178 | 176 |
| DTUL (°F., ⅛") | 283 | 270 |
| Tensile Strength (psi) | 7010 | 6240 |
| Notched Izod (ft-lbs/in) | 0.6 | 5.7 |
| GFWI (in-lbs) | <1 | 288 |
| Elongation (%) | 1.9 | 38 |

It will be evident from the foregoing that various modifications can be made to this invention. Such, however, are considered as being within the scope of the invention.

What is claimed is:

1. A moldable composition comprising a γ-sultone derivative of an ethylene/propylene/substituted methylene norbornene terpolymer and a polymer which comprises in weight percent from about 70 to about 90 recurring units of a vinyl aromatic monomer, from about 5 to about 15 recurring units of a monomer having an active hydrogen with an acidity constant (pKa) within the range of from about 7.5 to about 10.5 and from about 5 to about 15 recurring units of a vinyl pyridine monomer selected from the group consisting of 2-vinyl pyridine and 4-vinylpyridine.

2. The moldable composition of claim 1 in which said terpolymer is employed in an amount within the range of from about 1 to about 30 weight percent and said polymer is employed in an amount within the range of from about 90 to about 70 weight percent.

3. The moldable composition of claim 1 in which said terpolymer is employed in an amount within the range of from about 15 to about 25 weight percent and said polymer is employed in an amount within the range of from about 85 to about 75 weight percent.

4. The composition of claim 1 in which said terpolymer contains from about 40 to about 55 weight percent of recurring units of ethylene.

5. The composition of claim 1 in which said terpolymer contains from about 30 to about 59 weight percent of recurring units of propylene.

6. The composition of claim 1 in which said terpolymer contains from about 1 to about 15 weight percent of recurring units of substituted methylene norbornene.

7. The composition of claim 1 in which said terpolymer contains from about 8 to about 12 weight percent of recurring units of substituted methylene norbornene.

8. The composition of claim 1 in which in said terpolymer said substituted methylene norbornene is methylenenorbornene.

9. The composition of claim 1 in which in said terpolymer said substituted methylene norbornene is ethylidene norbornene.

10. The composition of claim 1 in which in said terpolymer said substituted methylene norbornene is propylidene norbornene.

11. The composition of claim 1 in which said terpolymer has a number average molecular weight within a range of from about 100,000 to about 500,000.

12. The composition of claim 1 in which said terpolymer has a number average molecular weight within the range of from about 150,000 to about 350,000.

13. The composition of claim 1 in which said terpolymer has a polydispersity Mw/Mn within the range of from about 1.7 to about 5.0.

14. The composition of claim 1 in which said terpolymer has a γ-sultone functionality by sulfur analysis within the range of from about 10 to about 100 milliequivalents per 100 grams of EPDM polymer.

15. The composition of claim 1 in which said terpolymer has a γ-sultone functionality as measured by sulfur content analysis within the range of from about 50 to about 90 milliequivalents per 100 grams of EPDM polymer.

16. The composition of claim 1 in which from about 10 to about 40 weight percent recurring units of ethylenically unsaturated monomer are substituted for an equal amount of said vinyl aromatic monomer.

17. The composition of claim 1 in which the molar ratio of monomer having active hydrogen to vinyl pyridine monomer is not less than 1.0 nor greater than 1.75.

18. The composition of claim 1 in which in said polymer said vinyl aromatic monomer is selected from the group consisting of styrene, para-methylstyrene, alpha-methylstyrene, t-butylstyrene and dibromostyrene.

19. The composition of claim 1 in which in said polymer said monomer having an active hydrogen is selected from the group consisting of maleimide and para-hydroxyphenylmaleimide.

20. The composition of claim 15 in which said ethylenically unsaturated monomer is selected from the group consisting of acrylonitrile, methylmethacrylate and N-substituted maleimides.

21. The composition of claim 1 in which said polymer has a number average molecular weight within the range of from about 90,000 to about 300,000.

22. The composition of claim 1 in which said polymer has a number average molecular weight within the range of from about 110,000 to about 250,000.

23. A method of producing a molded composition which comprises forming a blend comprising a γ-sultone derivative of an ethylene/propylene/substituted methylene norbornene terpolymer and a polymer which comprises in weight percent, from about 70 to about 90 recurring units of a vinyl aromatic monomer from about 5 to about 15 recurring units of a monomer having an active hydrogen with an acidity constant (pK$_a$) within the range of from about 7.5 to about 10.5 and, from about 5 to about 15 recurring units of vinyl pyridine monomer selected from the group consisting of 2-vinyl pyridine and 4-vinyl pyridine, and molding the resulting blend.

24. A molded composition comprising a continuous phase and a disperse phase within the continuous phase wherein said disperse phase is a γ-sultone derivative of an ethylene/propylene/substituted methylene norbornene terpolymer and said continuous phase is a polymer which comprises in weight percent from about 70 to about 90 recurring units of a vinyl aromatic monomer, from about 5 to about 15 recurring units of a monomer having an active hydrogen with an acidity constant (pK$_a$) within the range of from about 7.5 to about 10.5 and from about 5 to about 15 recurring units of a vinyl pyridine monomer selected from the group consisting of 2-vinyl pyridine and 4-vinyl pyridine.

* * * * *